(12) United States Patent
Minnich et al.

(10) Patent No.: US 8,133,055 B2
(45) Date of Patent: Mar. 13, 2012

(54) REFRESHABLE BRAILLE DISPLAY DEVICE

(76) Inventors: Daniel Charles Minnich, Chattanooga, TN (US); Hanna Francis Bawab, Toronto (CA); Jarrod Robertson, Bloomfield Hills, MI (US); Patrick Doll, Cincinnati, OH (US)

( * ) Notice: Subject to any disclaimer, the term of this patent is extended or adjusted under 35 U.S.C. 154(b) by 0 days.

(21) Appl. No.: 12/820,922

(22) Filed: Jun. 22, 2010

(65) Prior Publication Data

US 2011/0117525 A1    May 19, 2011

Related U.S. Application Data

(63) Continuation of application No. 11/567,700, filed on Dec. 6, 2006, now Pat. No. 7,744,372.

(60) Provisional application No. 60/748,003, filed on Dec. 6, 2005.

(51) Int. Cl.
*G09B 21/00*    (2006.01)

(52) U.S. Cl. ........................................ 434/113

(58) Field of Classification Search .................. 434/112, 434/113, 114, 115; 340/407.1, 407.2
See application file for complete search history.

(56) References Cited

U.S. PATENT DOCUMENTS

| | | | | |
|---|---|---|---|---|
| 3,987,438 | A * | 10/1976 | Lindenmueller et al. | 340/407.1 |
| 4,500,293 | A * | 2/1985 | Eltgen | 434/114 |
| 4,586,904 | A * | 5/1986 | Chlumsky | 434/114 |
| 5,086,287 | A * | 2/1992 | Nutzel | 340/407.1 |
| 5,522,728 | A * | 6/1996 | Kaplan | 434/112 |
| 6,109,922 | A * | 8/2000 | Litschel et al. | 434/114 |
| 6,639,510 | B1 * | 10/2003 | Soulie | 340/407.2 |
| 6,734,785 | B2 * | 5/2004 | Petersen | 340/407.1 |
| 6,776,619 | B1 * | 8/2004 | Roberts et al. | 434/113 |
| 6,819,228 | B2 * | 11/2004 | Gipson et al. | 340/407.1 |

* cited by examiner

*Primary Examiner* — Kurt Fernstrom
(74) *Attorney, Agent, or Firm* — Brian C. Meadows

(57) ABSTRACT

Disclosed is a refreshable Braille display device comprised of a rotary character display assembly which can display a refreshable Braille character in the plane of the rotary display assembly. Also disclosed is a method of displaying a refreshable Braille character.

16 Claims, 16 Drawing Sheets

REFRESHABLE BRAILLE DISPLAY DEVICE

CROSS-REFERENCE TO RELATED APPLICATIONS

This application is a continuation of and claims the benefit of priority to U.S. patent application Ser. No. 11/567,700, filed Dec. 6, 2006, now U.S. Pat. No. 7,744,372 which application claims the benefit of priority to U.S. Provisional Patent Application Ser. No. 60/748,003; filed Dec. 6, 2005. The entire disclosures of these patent applications are incorporated by reference herein for all purposes.

FIELD OF THE INVENTION

The present invention relates generally to the field of refreshable Braille display devices and more particularly to a refreshable Braille display device comprised of a rotary display assembly.

BACKGROUND OF THE INVENTION

Braille is the language of visually impaired readers whose vision is impaired to the extent that they cannot read printed material. Reading Braille relies on the sense of touch, where reading is done by running a finger over a combination of characters. This method was invented by Louise Braille (1809-1852) in 1821 at the age of 12. Louise Braille became visually impaired at the age of 3 and developed this method to enable him to live equally with the people around him.

A typical Braille character is comprised of six raised pins or bumps in a Braille cell grid having three rows high and two columns wide. Different combinations of the six pins represent different characters. In other applications, a Braille cell may be comprised of 8 or more Braille dots arranged in a grid four or more rows high and two columns wide. For example, the word "hello" in a typical six pin Braille cell is shown below.

Refreshable Braille Displays (RBDs) are devices that allow visually impaired readers to review work or read material, which an enabled reader can do on a computer screen. Refreshable Braille Displays range in terms of the number of characters presented on one line, but most standard displays can present in the range of from 40 to 80 cell characters.

Unfortunately, many visually-impaired citizens around the country are forced to use the traditional audio device method to review work or read material due to the scarce supply and high cost of RBD's. This problem stems from the fact that the Braille displays currently on the market are very expensive to produce and maintain. These devices typically utilize a dedicated Piezoelectric crystal actuator for each raised character dot in a cell grid. These Piezoelectric actuators expand when an electric potential is applied to them, producing a change in the mechanism leading to a protruding bump. Repairs are also expensive and inconvenient because they require the user to relinquish their unit for the duration of the repair and because of the complexity and intricacy of the Piezoelectric actuators of the RBD unit itself.

Improvement in such devices producing computer-refreshable Braille text for tactile reading by the blind and visually impaired could thus be utilized thereby broadening accessibility to computer services such as electronic books, e-mail and other network access, and general computer use. Improvements in cost and mechanical reliability must be attained in order to facilitate more widespread use of refreshable Braille devices. Thus, there is a need in the art for a refreshable Braille display device which can reduce the overall cost to the consumer and still accurately display and refresh a set of Braille characters, occupy less space than existing RBDs, be easy to clean, be tactilely and aesthetically pleasing, and produce no objectionable noise.

SUMMARY OF THE INVENTION

The present invention is based, in part, upon the invention of an improved refreshable Braille display device comprised of a rotary character display assembly which can display any desired number of refreshable Braille characters in the plane of the rotary display assembly.

In one aspect, the refreshable Braille display device comprises a Braille character display assembly having a lower rotary plate defining a plurality of lower bearing wells, each lower bearing well configured to house a bearing; an upper rotary plate having a substantially planar reading surface and defining a plurality of upper bearing wells configured to receive a bearing, the upper rotary plate being positioned in overlying registration with and connected to the lower rotary plate such that each upper bearing well is in overlying registration with one of the plurality of lower bearing wells to provide a plurality of bearing chambers, wherein the plurality of bearing chambers each have a bearing disposed therein and form at least one Braille character cell array configured to rotate about, and in a plane substantially perpendicular to, a rotary axis. A stationary divider plate is disposed between the lower and upper rotary plates and defines a plurality of apertures configured to selectively allow communication between the respective bearing wells when a lower bearing well and an upper bearing well are each positioned in registration with one of the plurality of apertures. A means is also provided for selectively positioning the bearing in at least one bearing chamber in the respective upper or lower bearing wells of the character cell array when communication between the respective bearing wells is selectively allowed.

In another aspect, the present invention provides a method of displaying a refreshable Braille character. The method generally comprises providing a substantially planar Braille character display assembly comprising a plurality of bearing chambers, wherein the plurality of bearing chambers each have a bearing disposed therein and form a plurality of Braille character cell arrays configured to rotate about, and in a plane substantially perpendicular to, a rotary axis; positioning at least one of the plurality of bearing chambers of the Braille character cell array in registration with a means for selectively positioning a bearing; selectively positioning the bearing in the bearing chamber in an upper portion of the bearing chamber to display a raised Braille character dot; and maintaining the selectively positioned bearing of step c) in the upper portion of the bearing chamber while the substantially planar Braille character display assembly is rotated at least one revolution about the rotary axis.

Additional aspects of the invention will be set forth, in part, in the detailed description, and any claims which follow, and in part will be derived from the detailed description, or can be learned by practice of the invention. It is to be understood that both the foregoing general description and the following detailed description are exemplary and explanatory only and are not restrictive of the invention as disclosed and/or as claimed.

BRIEF DESCRIPTION OF THE DRAWINGS

The accompanying drawings, which are incorporated in and constitute a part of this specification, illustrate certain aspects of the instant invention and together with the description, serve to explain, without limitation, the principles of the invention. Unless indicated otherwise, like numerals represent like elements.

DETAILED DESCRIPTION OF THE INVENTION

The present invention can be understood more readily by reference to the following detailed description, examples, and claims, and their previous and following description. However, before the present compositions, devices, and/or methods are disclosed and described, it is to be understood that this invention is not limited to the specific articles, devices, and/or methods disclosed unless otherwise specified, as such can, of course, vary. It is also to be understood that the terminology used herein is for the purpose of describing particular aspects only and is not intended to be limiting.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used herein, the singular forms "a," "an" and "the" include plural referents unless the context clearly dictates otherwise. Thus, for example, reference to a "ball bearing" includes aspects having two or more such ball bearings unless the context clearly indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Figure 1:
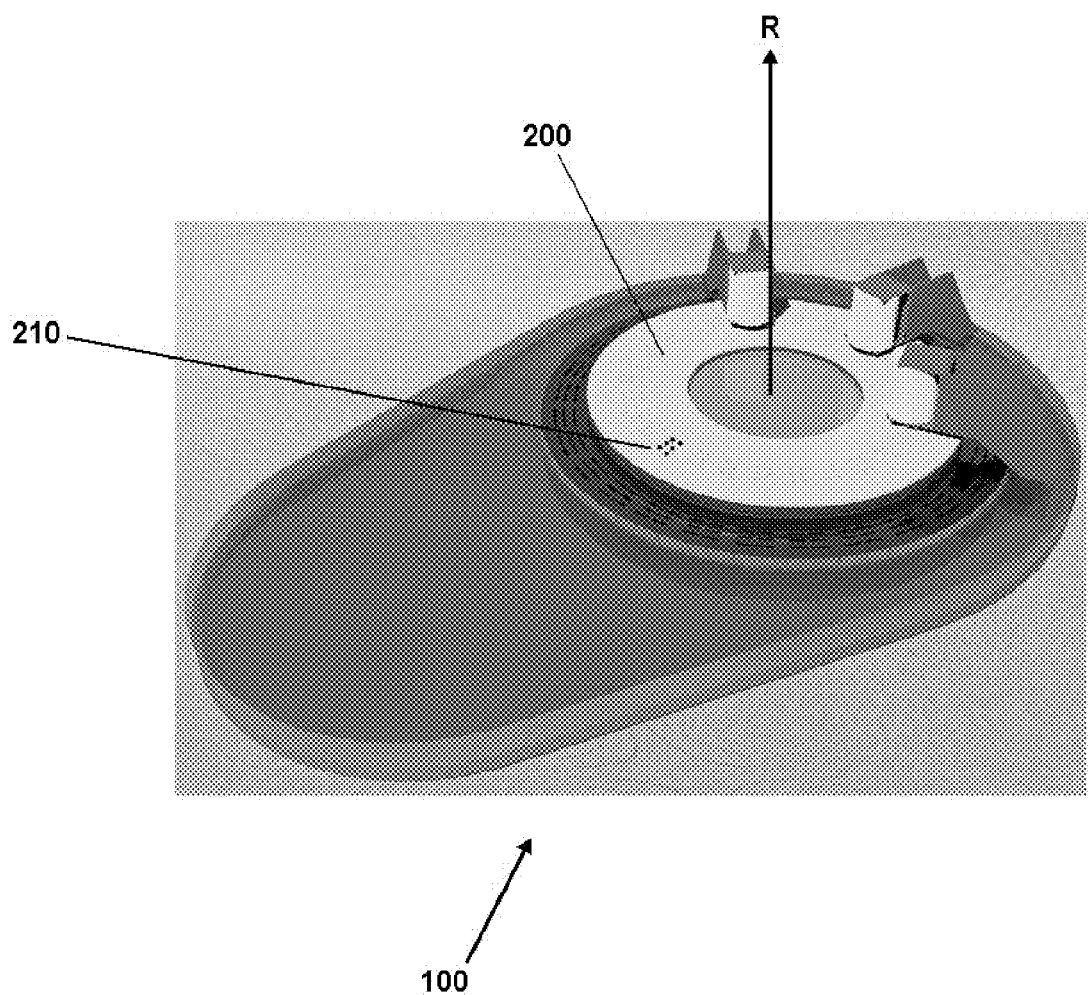
FIG. 1 is a perspective view of an exemplary refreshable Braille display device according to one aspect of the present invention.

As summarized above, the present invention provides a refreshable Braille display device comprised of a rotary character display assembly which can display a refreshable Braille character in the plane of the rotary display assembly. With reference to FIG. 1, an exemplary refreshable Braille display device 100 is shown. The exemplified display device generally comprises a rotary display assembly 200 configured to rotate about, and in a plane substantially perpendicular to, a rotary axis R. The rotary display assembly is configured to display a plurality of refreshable Braille character cells 210 that can rotate about the rotary axis and in the plane of the rotary display assembly.

Figure 2:
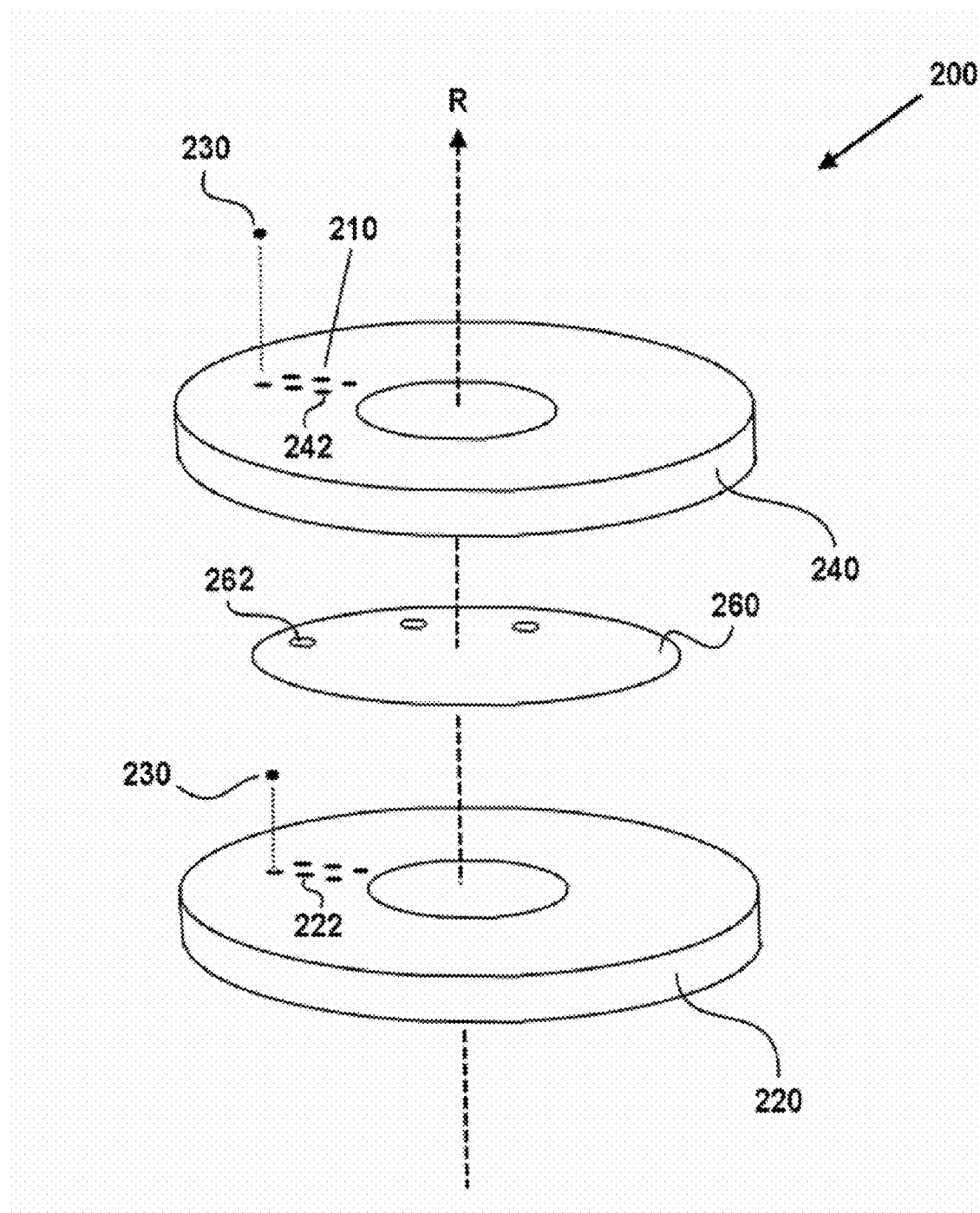
FIG. 2 is an exploded perspective view of an exemplary Braille character display assembly according to one aspect of the present invention.
Figure 3:
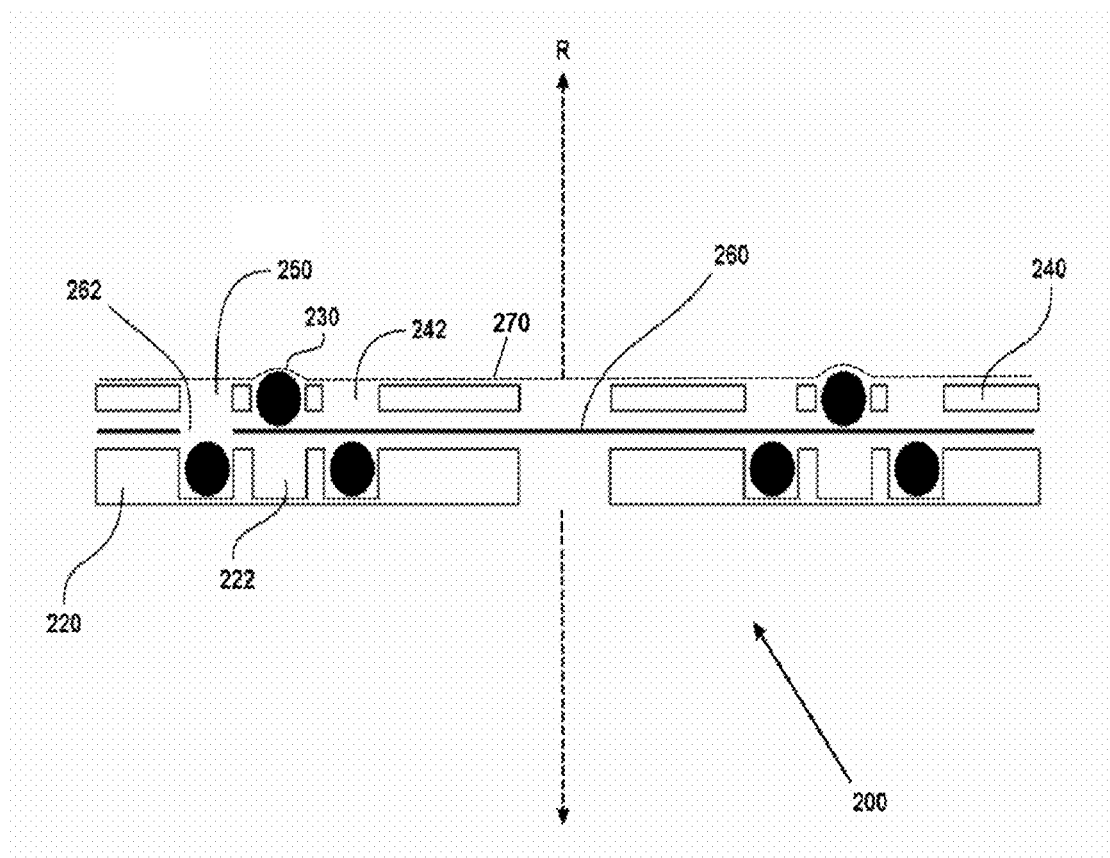
FIG. 3 is a schematic cutaway side view of an exemplary Braille character display assembly according to one aspect of the present invention.

As shown in FIG. 2, the rotary display assembly 200 is comprised of a lower rotary plate 220 having a plurality of lower bearing wells 222 formed therein. Each lower bearing well is configured to house one of a plurality of bearings 230. An upper rotary plate 240, having a plurality of upper bearing wells 242 configured to received one of the plurality of bearings, is positioned in overlying registration with the lower rotary plate. As shown in FIG. 3, the upper bearing wells and lower bearing wells, when positioned in overlying registration, form a plurality of bearing chambers 250. The plurality of bearing chambers are spatially arranged to form the plurality of Braille character cells 210. In particular, each Braille character cell is comprised of an array of bearing chambers positioned circumferentially about the rotational axis. For example, as shown, each Braille character cell can comprise an array of six bearing chambers positioned in a conventional Braille cell grid having three rows high and two columns wide. In use, one or more bearings 230, housed within one or more respective bearing chambers, can be selectively positioned in a raised or lowered position to display a desired combination of character dots and thus a desired Braille character.

As shown for example in FIG. 3, a stationary divider plate 260 is disposed between the lower and upper rotary plates and separates the bearing chambers into an upper portion 252 and a lower portion 254. The stationary divider plate also defines a plurality of pass through apertures 262 configured to selectively allow communication between the respective upper and lower bearing wells when a lower bearing well and an upper bearing well are each rotated into registration with one of the plurality of pass through apertures 262. In use, the stationary plate enables the plurality of bearings housed within the bearing chambers to be selectively positioned in either the upper chamber portion (raised position) or the lower chamber portion (down position) depending on which Braille character is to be displayed. Once positioned, a bearing will then remain in the respective upper or lower portion of a bearing chamber until the bearing is selectively repositioned in the opposing portion of a bearing chamber.

Figure 4:
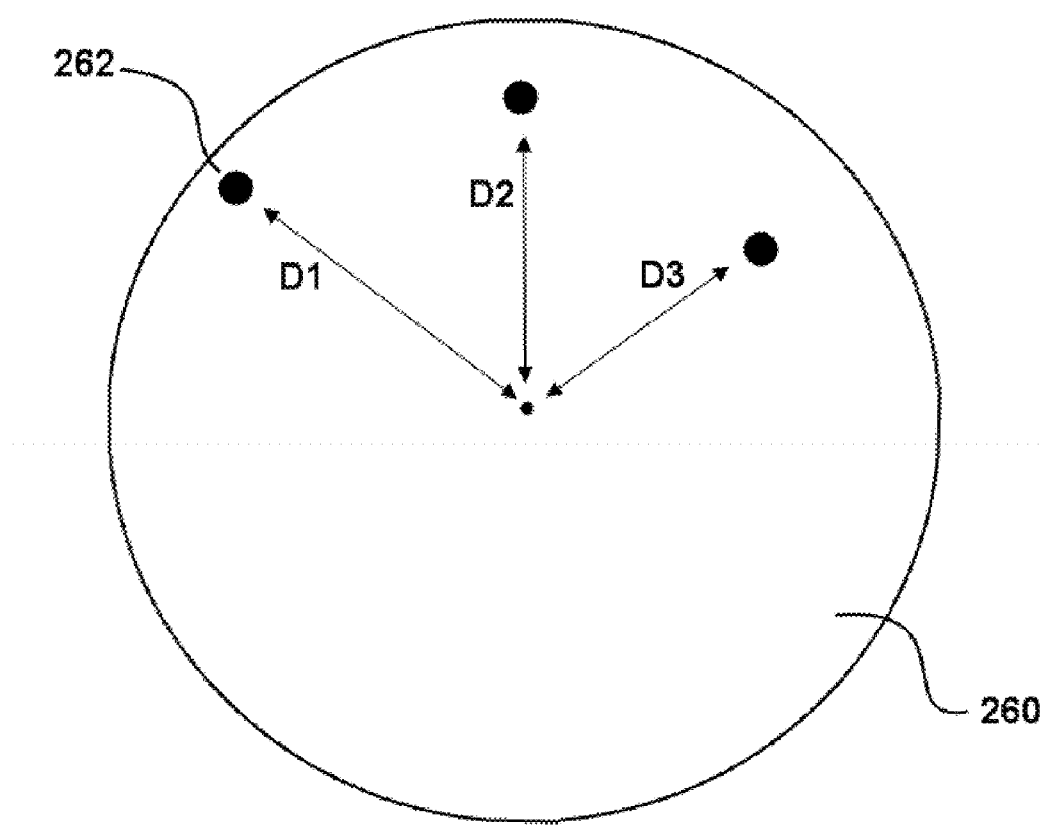
FIG. 4 is schematic top view of an exemplary stationary divider plate according to one aspect of the present invention.

An exemplary stationary plate is also depicted in FIG. 4. As shown, the stationary divider plate can comprise a plurality of pass-through apertures 262 defined therein that are sized and shaped to allow the selective passage of bearing there through. Thus, by allowing the selective passage of a ball bearing through an aperture in the stationary divider plate, a ball bearing can selectively pass from the lower bearing chamber portion to the opposed upper chamber portion and vice versa through a pass through aperture defined by the stationary divider plate. In one aspect, the number of pass through apertures is dependent upon and can correspond to the number of rows of Braille dots in the Braille character cell. For example, in an aspect comprising six Braille dot character cell having array of 3 dots high and two dots wide, the stationary divider plate can define three pass through apertures. Alternatively, in an aspect comprising an 8 Braille dot character cell having 4 dots high and two wide, the stationary divider plate can define four pass through apertures. As further shown in FIG. 4, the exemplified three pass through apertures 262 can each be positioned at differing distances D1, D2 and D3 from the rotational axis. According to this aspect, each distance D1, D2, and D3 can be selected so that each row of bearing chambers of the Braille character cell will, when rotated, pass in communication with a pass through aperture dedicated to that row of bearing chambers.

The stationary divider plate can further be configured such that pass though aperture(s) can be aligned with a means for selectively positioning a bearing in the upper portion of the bearing chamber. For example, as will be described in more detail below, in one embodiment an electromagnet assembly can be used to selectively position a bearing in the upper portion of a bearing chamber when the respective upper and lower bearing wells are aligned in registration with a pass-through aperture. Therefore, according to this aspect, the pass through aperture(s) of the stationary divider plate should also be aligned with the electromagnet.

In one aspect, it is preferable for the stationary divider plate to have the thinnest allowable thickness in order to minimize the distance of travel between the lower position of the ball bearings and the upper position. The plate should however, be substantially rigid so that it does not deflect or deform when the user is reading and pushing down on the character dots. Optionally, the plate can be non-ferric so that it does not interfere with the magnetism involved in actuating or pulling a ball bearing upwards into the raised or actuated position. To this end, in an exemplary aspect, and not meant to be limiting, the stationary divider plate can be comprised of a copper plate, which is non-ferric, relatively stiff and rigid, and can have a relatively thin thickness as compared to the majority of the plastic or polymeric materials exhibiting the same characteristics. In addition, a copper plate can provide a relatively smooth surface which can reduce the friction of the ball bearings that roll on it. In an exemplary aspect, the thickness of the copper plate can be approximately 0.02 inches.

It is contemplated that the apertures can be configured in any desired shape, such as for example, a substantially circular hole, or an elongated slot. In the exemplified aspect, the pass through apertures can be substantially circular having a diameter selected to be large enough to allow a ball bearing to selectively pass through the aperture but small enough not to allow adjacent ball bearings to pass through at the same time. In an exemplary aspect, the pass through aperture can be approximately 3.26 mm in diameter.

The dimensions of the upper and lower rotary plates, including the diameter of the plates, thickness of the plates, and the dimensions and spacing of the Braille character cells, will be dependent in part, upon the number of character cells desired, and the size of the Braille characters desired. In an exemplified aspect, these dimensions can be derived directly from the standard Jumbo American Braille dimensions. Thus, in one aspect, and without limitation, the cell-to-cell spacing for an exemplified device comprising 30 character cells can be approximately 8.76 mm.

Based upon the exemplified cell to cell character spacing set forth above, the following calculations can then be used to determine the desired diameter for the upper rotary plate. Specifically, the reference radius can be taken to be the middle row of the Braille character cell. As the exemplary distance between the exemplified cells are 8.76 mm apart, when the cells are arranged in a circular pattern, the Braille dots in the upper corners of adjacent Braille character cells become closer together and the lower ones become further apart from each other. By taking the middle row of the Braille characters as the reference point, the difference in Braille character spacing is apportioned. Accordingly, using equations of the arcs, Equations (I) can be used to calculate the reference radius.

$$r = \frac{8.76(360)}{2\pi\theta}$$ [Equation (I)]

Where r is the reference radius, $$\theta = \frac{360}{n}$$

where n is the number of cells on the disk. An exemplary illustration of the variables in the Equation (I) is set forth below.

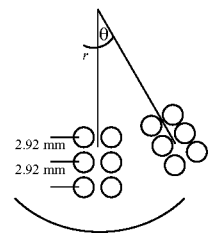

Using the equation (I) above, an exemplary display device comprising 30 Braille character cells and having a cell separation of approximately 8.76 mm provides a reference radius of 41.83 mm. If desired, an added distance cushion can also be added to the reference radius to provide a cushion for a user to manually rotate the display assembly. In one aspect, the cushion can be approximately 20 mm added to the calculated reference radius. It will also be appreciated that the angular separation between the character cells in a circumferentially spaced arrangement will depend on the number of character cells. To that end, the exemplary aspect comprised of 30 character cells will have a separation angle of approximately 12°. Using the exemplary procedure set forth above, one of ordinary skill in the art will be able to arrive at the desired size of the top rotary disk without requiring any undue experimentation.

In one aspect, the lower rotary plates can be sized and shaped to be at least substantially the same dimension as the top rotary plate. Additionally, in a further aspect, the lower rotary plate can also comprise a larger or smaller radius than the top rotary track plate in order to, for example, accommodate for additional features of the display device, such as the timing plate apertures that discussed in detail below.

The dimensions and the spacing of the upper and lower bearing wells forming the bearing chambers where the ball bearings are housed can also be determined according to the Jumbo American Braille dimensions, as well as taking into account any optional manufacturing tolerances. For example, the dot base diameter of a Jumbo American Braille dot is approximately 1.7 mm and the protrusion height of the dot from the surface is approximately 0.5 mm. As this is the diameter of the actual dot, the well diameter would therefore need to be slightly larger. Thus, a bearing well diameter of approximately 2.16 mm can provide a raised dot resulting in a similar profile to that of the Jumbo American Braille dot.

The upper and lower rotary plates can manufactured from any desired materials, including for example, plastic or acrylic. The upper and lower rotary plates can also be configured to have any desired thickness which can, in part depend on the size of a particular bearing to be housed within a formed bearing well. For example, in one aspect it is desired for the lower plate to have a thickness sufficient to form bearing wells capable of housing at least substantially the entire bearing received therein. Thus, according to this aspect, the lower rotary plate can have a thickness at least equal to or greater than the diameter of a desired bearing. Further, it should also be understood that the lower plate can further be comprised of a plurality of plates having thickness which, in combination provide a desired thickness. Likewise, in one aspect, the thickness of the upper rotary plate is less than that of a desired bearing diameter so that a bearing in the raised position and resting on the stationary divider plate will protrude beyond the surface of the top rotary plate resulting in a raised bump or pimple forming a dot of the Braille character cell. To this end, in an exemplary aspect, and without limitation, the upper rotary plate can be approximately 1/16" thick and the lower rotary plate can be approximately 3/32" thick.

The refreshable display device of the present invention can also be configured to provide any desired number of refreshable Braille character cells. For example, the device can be configured to comprise from 1 to several hundred Braille character cells, including for example 10, 20, 30, 40, 50, 60, 70, 80, 90, 100, or even 200 or more character cells. In still another aspect, and as exemplified herein, a refreshable Braille display device of the present invention can comprise 30 Braille character cells.

Likewise, the number of raised character dots and hence the number of ball bearings can be dependent upon the number of character cells in the rotary display assembly. For example, as stated above a conventional printed Braille character cells comprise a grid of six dots. Thus, according to this aspect, the number of ball bearings can be proportional to the number of character cells by a factor of 6. Accordingly, in the exemplified aspect comprised of 30 character cells, the rotary display device further comprises 180 ball bearings.

The ball bearings can be of any desired size suitable for providing a raised character dot in a legible Braille character cell. In one aspect, and as exemplified herein, the ball bearings are sized and shaped to provide a Braille dot that conforms to the recognized standards of the Jumbo American Braille dimension, having for example an approximate raised dot height of 0.5 mm and an approximately raised dot base radius of 0.85 mm. Accordingly, a particular ball bearing providing the exemplified raised character dot parameters exemplified above can be calculated according to the procedure set forth below. It should be understood that in view of the exemplary calculation procedure, one of ordinary skill in the art will be able to determine an appropriate ball bearing based upon the particular raised character dot parameters desired.

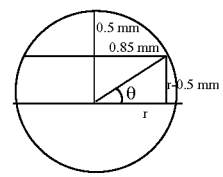

In particular, using the Equation (II) below and solving for the two unknowns r and θ as illustrated above, the diameter of a ball bearing that will provide the desired raised dot parameters can be calculated. The 0.5 mm is the exemplary height of the ball bearing protruding from the upper plate and the 0.85 mm is the exemplary radius of the Jumbo American Braille dimension for the diameter.

$$r \sin \theta = r - 0.5 \text{ mm}$$

$$r \cos \theta = 0.85 \text{ mm} \qquad [\text{Equation N.2}]$$

From these calculations, an exemplary ball bearing can have a diameter of approximately 1.945 mm. To this end, a conventional commercially available 2 mm diameter ball bearing will have an insignificant deviation from the calculated diameter and can be used as an exemplary bearing suitable for use in the present invention.

The ball bearings can be comprised of any desired material. However, in one aspect the bearings are comprised of a metallic material, such as any conventional ferrous metal, in order to be magnetically attracted by an electromagnetic actuator discussed in more detail below. Further, the ball bearing surface should, in one aspect, be smooth in order to easily roll over the top surface of the stationary divider mentioned above and discussed in more detail below. Accordingly, in one aspect, the ball bearings can be comprised of chrome-plated carbon steel such as the 2 mm chrome-plated steel ball bearings available from Small Parts, Inc. of Miami Lakes, Fla., USA (Part No. BS-M20-C). In still another aspect, the ball bearing can be comprised of a nickel-alloy combination.

In still a further aspect, a protective film or sheet 270 can also be applied to the top surface of the upper rotary plate in order to prevent the ball bearings from coming out of the display. The protective sheet can be formed of any desired material that is flexible enough to conform to the spherical contour of a raised ball bearing and tough enough so that it won't break with excessive use. To this end, in one aspect the protective film can be a latex layer. The latex layer can have any desired thickness, including for example, approximately 0.006", 0.010", or even 0.025". As will be appreciated upon practicing the present invention, the latex layer can also provide the added benefit of a soft feel for enhanced legibility. In addition, the latex layer can also prevent dirt and other contaminants from passing through the ball bearing pass through apertures.

The protective film such as a latex sheet can be attached to the display or reading surface of the upper rotary plate using any common craft spray adhesive such as Elmer's spray adhesive and, if needed, can then be trimmed to the appropriate dimensions. An exemplary latex sheet can be formed from 0.010" thick latex sheet from Small Parts, Inc. (Part No. SLR-010-B).

Figure 5:
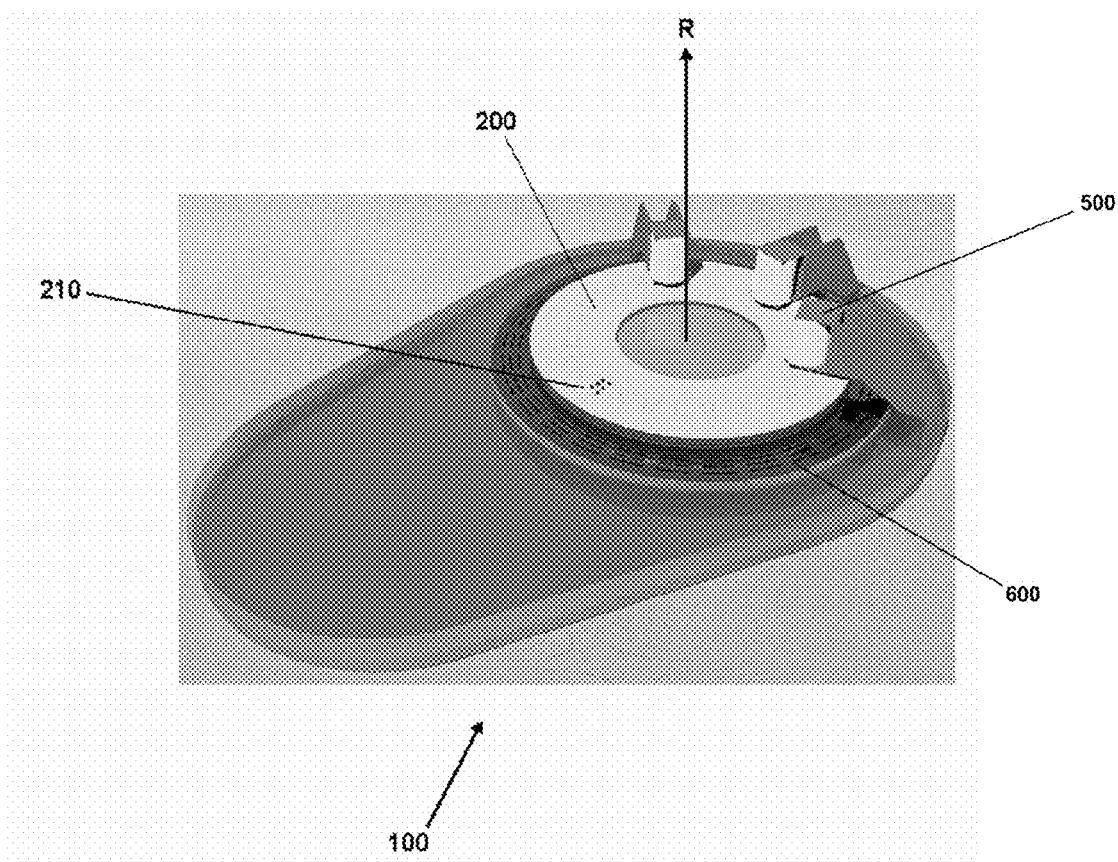
FIG. 5 a perspective view of an exemplary refreshable Braille display device according to one aspect of the present invention.

The refreshable display device further comprises a means for selectively positioning the bearings of a character cell array in a raised or lowered position when communication between the respective bearing wells is selectively allowed. For example, in one aspect and as shown in FIG. 5, the means for selectively positioning a bearing can comprise an electromagnetic actuator assembly 500 configured to magnetically attract a metallic bearing. According to this aspect, a bearing housed in a lower bearing chamber portion (lower bearing well) can be magnetically attracted by an electromagnet and thus selectively raised into an upper chamber portion by the electromagnet. Alternatively, a bearing housed in an upper portion of a bearing chamber can be retained in a raised position by the electromagnet. Still further, a raised bearing can be refreshed or repositioned back to a lower bearing well by allowing the bearing to drop back to a lower portion under the force of gravity. In use, each bearing can be selectively positioned in a raised position such that the raised bearing forms a raised dot on the surface of the rotary display assembly. By selectively actuating or positioning any desired combination of the bearings within a Braille character cell into a raised position, any character of the Braille language can be provided on the surface of the rotary display.

The electromagnetic actuator assembly can comprise any conventional electromagnet or device that produces the same effect that is capable of lifting a ball bearing by applying a magnetic field that attracts the ball bearing upwards. In order to provide the largest lifting power to the ball bearings, the tip of the electromagnet can, for example, be positioned as close as 1 mm over the top of the upper rotary plate. The exemplary 1 mm spacing further accommodates for the exemplary 0.5 mm protrusion of the ball bearings, leaving an exemplary 0.5 mm safety factor so that there would be no collision between both surfaces. In one aspect, the actuators are not put inline to actuate the three row columns of the characters but rather are staggered around the circumference of the reader. Thus, in one aspect, the electromagnet of the middle row of Braille dots can be positioned opposite the reading site and the left and right electromagnet that actuates the upper and lower rows of Braille dots can be positioned approximately 60° apart from each side of the middle electromagnet. This configuration can allow the desired Braille cell to be completely displayed before reaching the reading site.

The electromagnetic actuators should be selected to also provide a sufficient magnetic activation force capable of drawing the ball bearing into the actuated position quickly enough before the next character cell is to be actuated. To this end, the requisite level of actuation force will depend upon several factors including the bearing size and weight, the distance a bearing will travel, the desired rotation speed of a display device, and others that will be known to one of ordinary skill in the art. Accordingly, using the exemplified display device of the present invention as an example, the requisite actuation force can be calculated as set forth below.

First, the length that the ball needs to travel, x, is given by Equation (III):

$$x = \frac{1}{2}d_l + d_t + t_{Cu}$$ [Equation (III)]

In the exemplified aspect, $d_l$ is the depth of the lower bearing well and is equal to 1/8", $d_t$ is the thickness of the top bearing well and is equal to 1/16", and $t_{Cu}$ is the thickness of the copper middle track and is equal to about 0.02". Accordingly, in the exemplified display device described herein, the traveling length of the ball bearing from the non-actuated position to the actuated position is approximately 0.146", or 3.7084 mm.

The time allowed for actuation before the actuation of the next dot can also be calculated as set forth below. In particular, a very fast or skilled Braille reader can read approximately 120 words per minute. Thus, with an average word length of five characters, a skilled reader can read up to 600 characters per minute. Accordingly, to support a fast Braille reading rate of approximately 600 characters per minute, an exemplified display comprising 30 characters or Braille cells would have a rotational speed of approximately 20 rpm (rotations per minute).

For an exemplary display having a radius to the outer row of Braille character dots of approximately 44.75 mm, the maximum possibly velocity of the balls bearings, which occurs at the outer radius, is given by Equation (IV):

$$v_{max} = \omega_{max} r_{outer}$$ [Equation (IV)]

This gives a maximum velocity of approximately 0.0938 m/s. From the distance traveled and the velocity, the time allowed for actuation can then be calculated as the quotient of the two. Therefore, the allowable time for actuation in one aspect as described herein can be 0.0266875 seconds.

Given the distance and time traveled, Equation (V) of one-dimensional kinematics can be applied to determine the acceleration, a, necessary:

$$x = \frac{a}{2}t^2 + v_0 t + x_0$$ [Equation (V)]

Where $v_0$ is the initial velocity and is equal to zero and $x_0$ is the original height and is also equal to zero. Simplifying the equation and solving for a gives a minimum necessary acceleration of approximately 10.4136 m/s². This is equal to the acceleration term in Newton's Second Law of Motion shown in Equation (VI):

$$\Sigma F = ma$$ [Equation (VI)]

The corresponding free-body diagram of the accelerating ball bearing is shown below, where $F_M$ is the force exerted by the electromagnet and mg is the force of gravity:

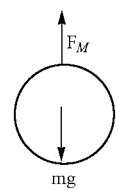

Substituting these values into Equation (VI), the equation simplifies to Equation (VII):

$$F_M - mg = ma$$ [Equation (VII)]

Therefore, in order to obtain the minimum electromagnetic force required for a successful actuation, the mass of the ball bearing should be calculated. The ball bearings as exemplified for purposes of this sample calculation have a diameter of 3/32", which yields a volume of $4.3143 \times 10^{-4}$ in³. The density of the ball bearings used is 0.283 lbs/in³ (the approximate density of steel), which yields a mass of $1.221 \times 10^{-4}$ lbs, or 5.5498×10$^{-5}$ kg. Substituting this mass value into Equation (VII) and solving for $F_M$ yields a minimum electromagnetic force required of $F_M$=0.0011 N. Using this sample calculation, one of ordinary skill in the art will be able to determine an electromagnet that will supply the requisite activation force for a refreshable Braille display device comprising a desired dimension and materials without requiring any undue experimentation. Following actuation, the character dots can then be refreshed or dropped to the lowered state by the force of gravity. To this end, the acceleration due to free-fall is roughly 9.81 m/s$^2$, which is within the acceptable tolerance of the exemplary minimum acceleration required of 10.4136 m/s$^2$ as calculated above. However, in still another aspect, refreshing the ball bearings from the top position to the bottom position could be accomplished using a permanent magnet or an activated electromagnetic positioned below the pass-through aperture in the stationary divider plate that would provide a gravity-assist force to move the ball bearing from the top position to the bottom position.

Figure 6:
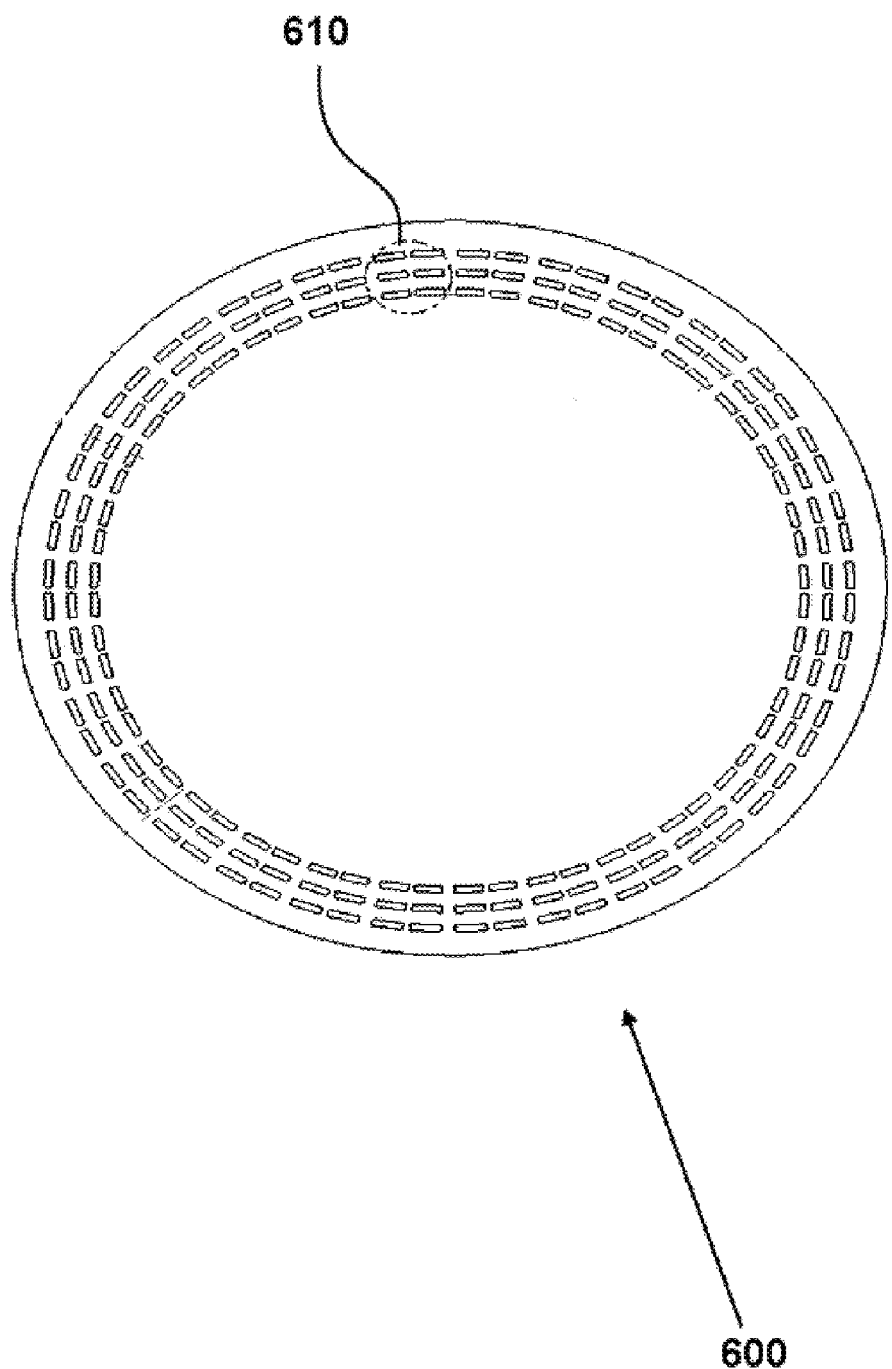
FIG. 6 is top view of an exemplary timing plate according to one aspect of the present invention.
Figure 6A:
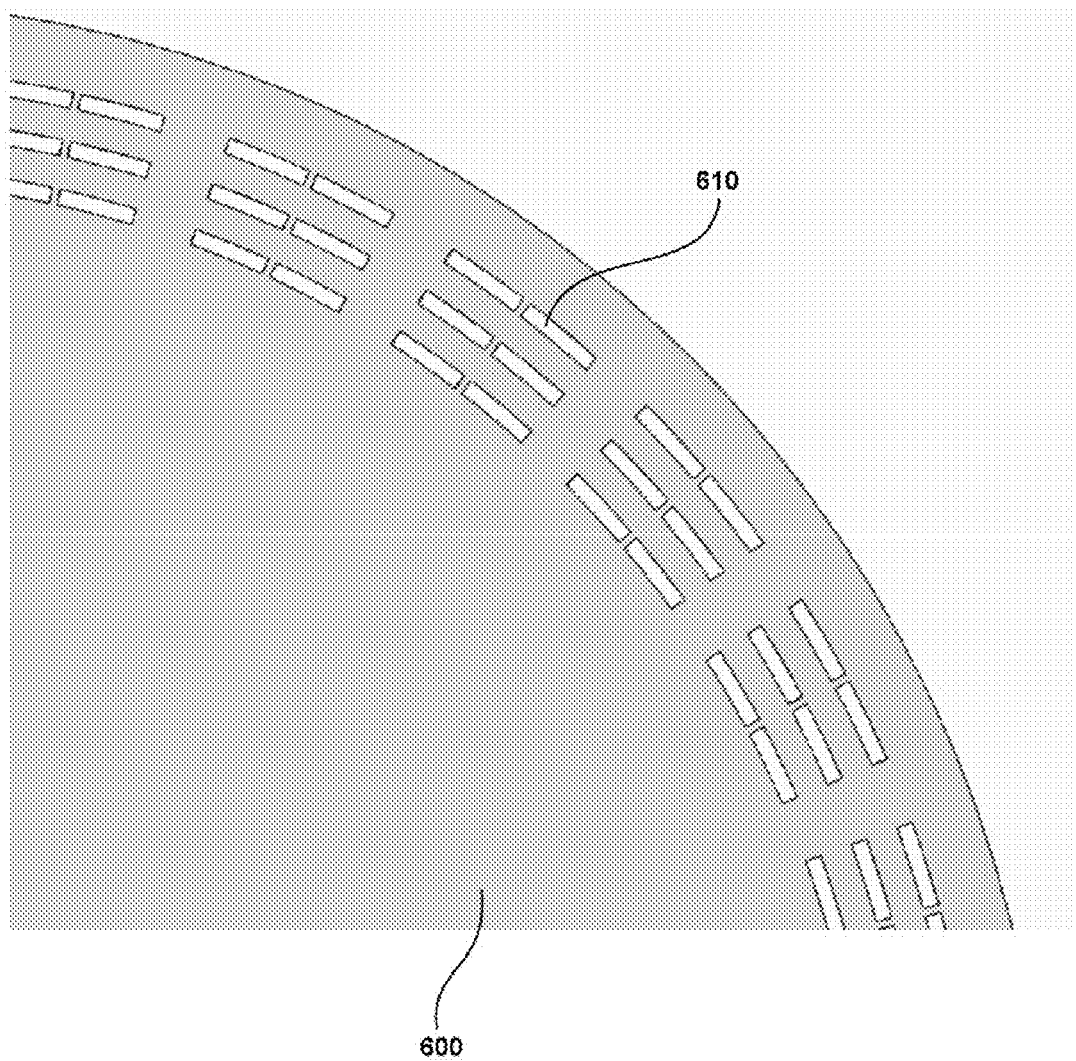
FIG. 6a is a close up illustration of the exemplary timing apertures as shown in FIG. 6
Figure 7:
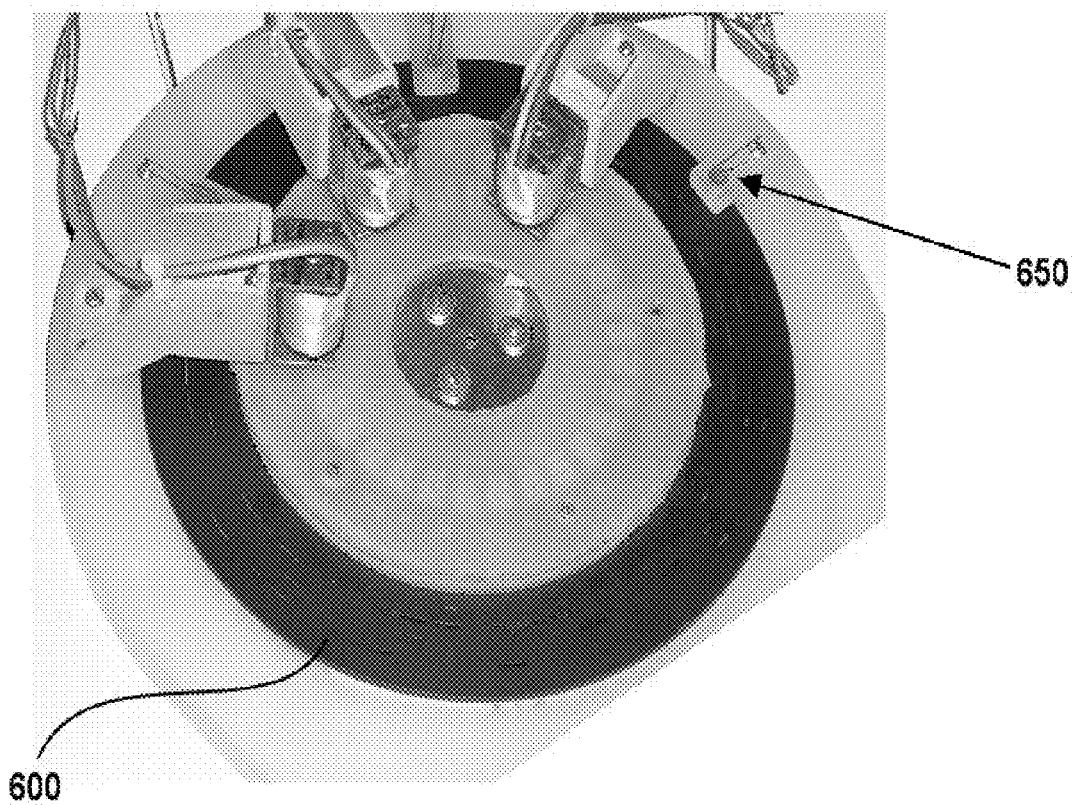
FIG. 7 is an illustration of an exemplary refreshable Braille device comprising a means for timing or regulating the selective positioning of a character bearing according to one aspect of the present invention.
Figure 8:
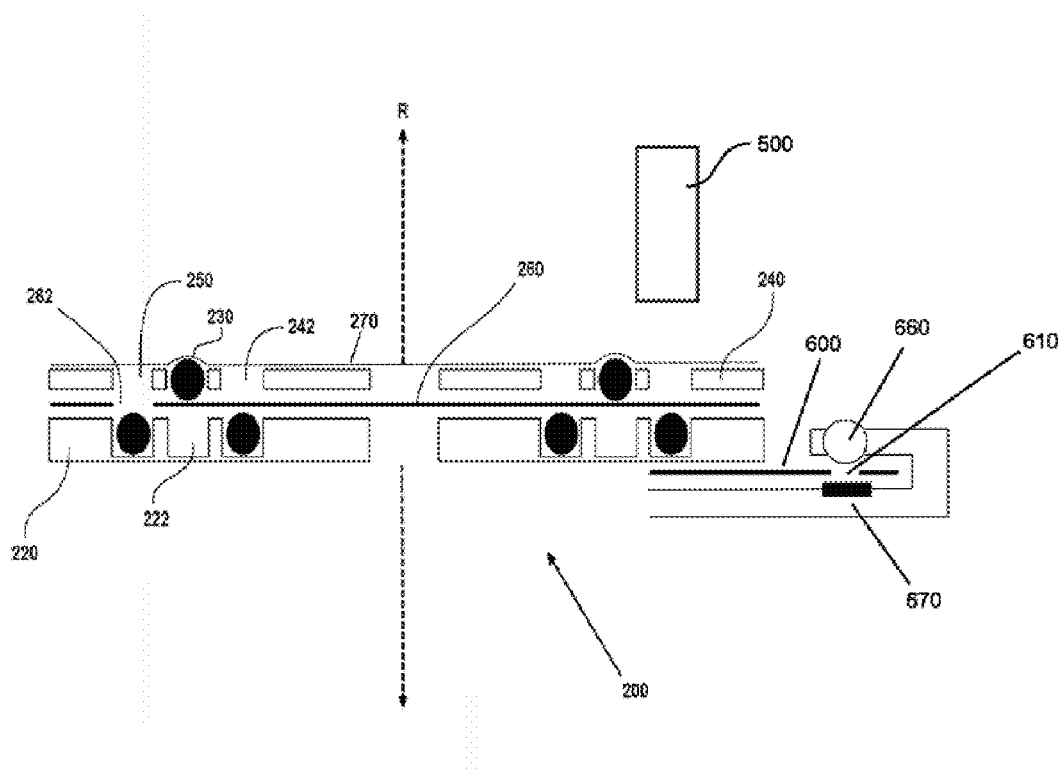
FIG. 8 is schematic cutaway side view of an exemplary light detection assembly according to one aspect of the present invention.

In still another aspect, the refreshable Braille display device of the present invention can further comprise a means for timing or regulating the selective actuation or positioning of a ball bearing. The timing means can be any mechanism or system capable of selectively triggering the selective actuation or positioning of a ball bearing. For example, the rotary display assembly can further comprise a rotary timing plate. The timing plate can be provided to regulate and ensure a selected set of ball bearings are selectively positioned at the correct sequence in time. As shown in FIG. 6, an exemplary timing disk 600 can define a plurality of timing apertures 610 positioned in the outer circumference portion of the timing plate disk. As further shown in FIG. 7 and FIG. 8, the timing apertures 610 can allow light to pass between a light source 660, such as an LED positioned above the timing plate, to a light detector 670, such as a photo resistor, positioned directly below the plate. In use, as the rotary display is rotated, a timing aperture can pass in alignment with a light detection assembly 650, comprising the light source and light sensor. In one aspect, there can be at least one light detection assembly, comprising a light source and a light detector, configured to selectively trigger the actuation or positioning of the bearings. Alternatively, as exemplified herein, there can be a plurality of light detection assemblies comprising a light source and light sensor, whereby a single light detection assembly is dedicated to each electromagnetic actuator and thus one for each row of dots in the Braille character cell.

Figure 9:
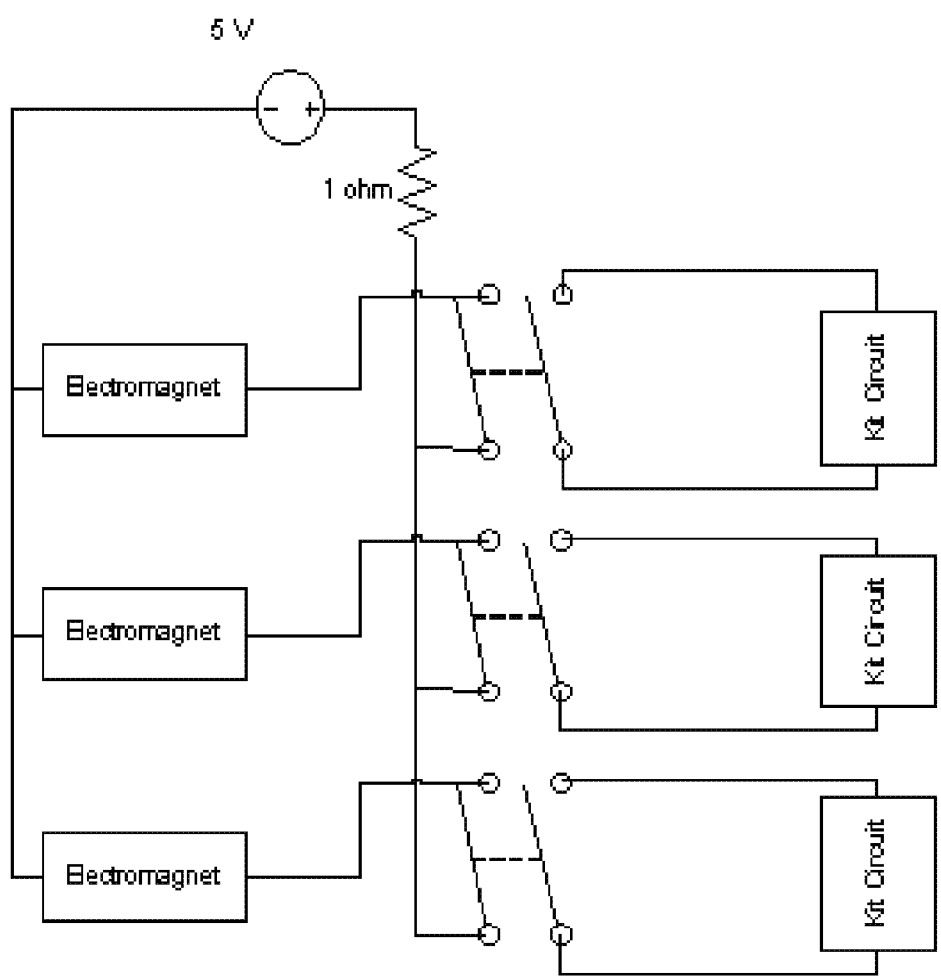
FIG. 9 is a schematic wiring diagram according to one aspect of the present invention.

Any light source and light sensor can be used however in the exemplified aspect, 3 light detectors and relays were bought as a kit from MPJA (Marlin P. Jones & Assoc., Inc., P.O. Box 530400, Lake Park, Fla. 33403). To that end, exemplary light sensors that are suitable for use include those that are included in relay kit Stock No. 7863-KT commercially available from MPJA. The light detectors can be mounted flush to the surface upon which the timing plate rotates into these mounting apertures with, for example, a conventional epoxy resin adhesive. Likewise, three green LEDs (Cat. No. 276-1622, from RadioShack, Fort Worth, Tex., USA) can for example be used to sensitize the light detectors. The three relay kits can be connected to a power supply with a breadboard from RadioShack (Experimentor 350 Cat. No. 276-175). In the exemplified aspect, three power supplies can be used to make the unit functional. One can be used for the relay/light detector kits, one can be used to provide power to the electromagnets, and one can be used to power the light source. Accordingly, FIG. 9 illustrates an exemplary schematic wiring diagram for the three power supplies. As shown, the electromagnets can for example receive 5 volts at approximately 2 amps each, and the light source can be connected in parallel to two 1.5 volt AA batteries connected in series to provide 3 volts. Although the exemplified RBD utilizes three separate power supplies, an alternative aspect can comprise a single power supply to power all three electrical subsystems of the display. In one aspect, this power supply/supplies can be integrated into the RBD itself or be connected to the RBD through a power cord with an integrated power supply/supplies.

As light from the LED passes through the aligned timing aperture defined by the timing disk, the light detector, such as a photo resistor, can detect and send a signal to a corresponding relay circuit which switches the connection in the relay and allows electric current to flow to an electromagnetic actuator. This in turn enables the electromagnet to generate a magnetic field which attracts a metallic ball bearing(s) and causes the ball bearing to be lifted up through the divider plate aperture towards the top of the display assembly. When the selected ball bearing to be actuated is positioned in alignment with the pass-through aperture in the stationary divider plate, the ball bearing will move from the lower chamber to the upper rotary chamber (or if the ball bearing is already in the upper rotary chamber, it will simply remain there when the electromagnet is turned on). As the display continues to rotate, the ball bearing will move past the pass-through hole in the divider plate and come to rest on top of the middle stationary plate, resulting in a raised character dot comparable in size to regular Jumbo Braille.

Figure 6B:
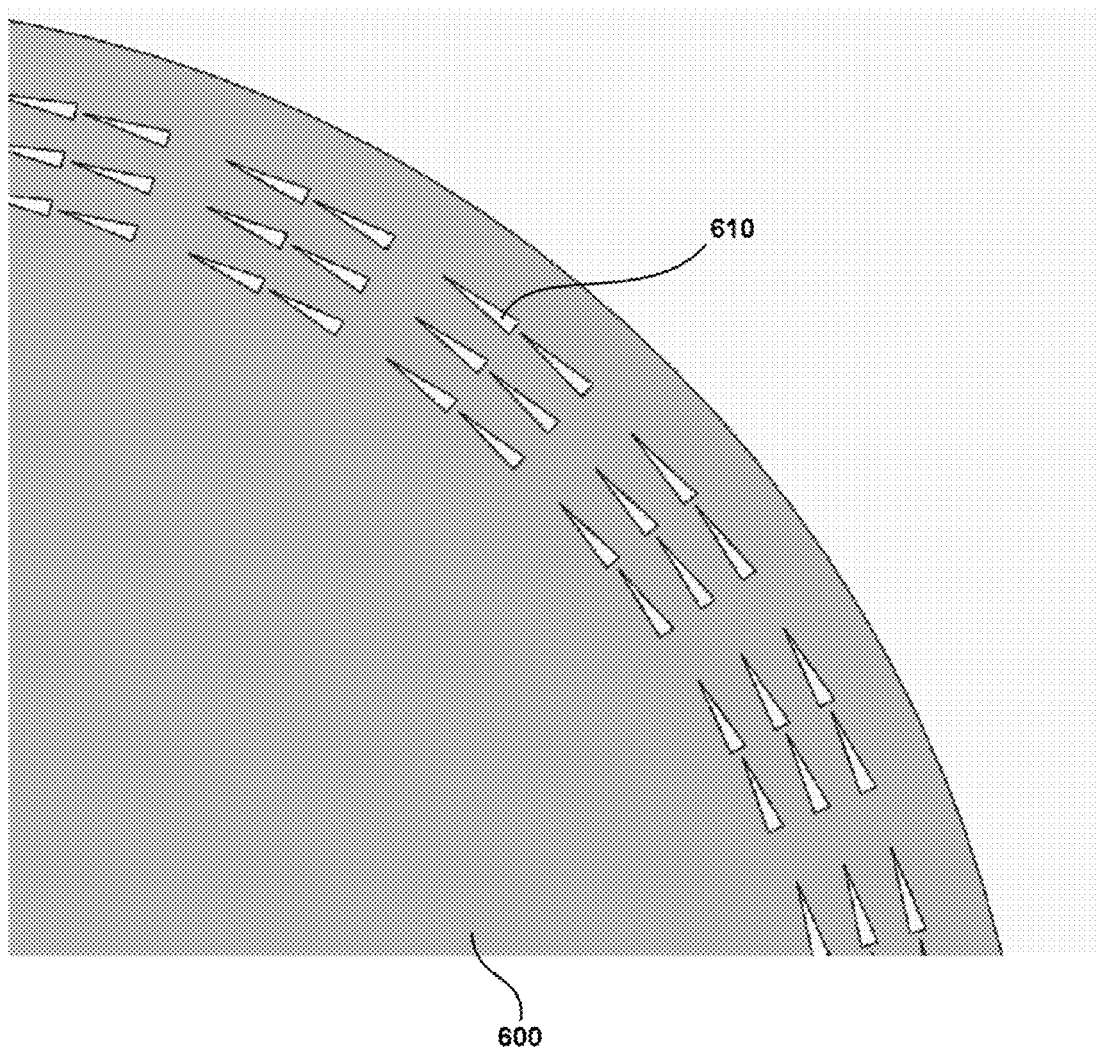
FIG. 6b is an in illustration of exemplary timing apertures having a tapered configuration in a circumferential direction.

In one aspect, the timing apertures can be aligned approximately 5° before the corresponding column of ball bearings, stop in between the two columns of ball bearings in a Braille character cell, and can begin again and extend, for example, to a position that is approximately 5° beyond the second column of ball bearings. As one of skill in the art will appreciate, this arrangement can ensure that the ball bearing receives the correct actuation signal and has adequate exposure to the pass-through apertures in the stationary divider plate to be correctly actuated per the actuation signal. The timing apertures can also be configured as slots approximately 1/16" in width so that it allows enough light to actuate one specific sensor. In still another aspect, and as exemplified in FIG. 6b, the timing apertures can also be configured as slots that are tapered in a circumferential direction. The circumferential tapering can provide a diminishing or increasing level of light passing through the aperture as the plate is rotated in either a clockwise or counterclockwise direction. The increased or decreased level of light passing through the timing aperture can be used to determine which direction the Braille display is being rotated, thereby allowing a user to read forward or backward in the text being read on the computer.

In an exemplary aspect, the timing plate can be connected to the bottom surface of the lower rotary plate. In addition, the timing disk can further define a center mounting aperture through which a fixed support pillar for connecting the stationary divider plate and stationary divider plate mounts to the display base can be positioned.

In an alternative aspect, the timing apertures can be formed by an appropriately sized and shaped lower rotary plate, eliminating the need for a separate timing disk. Still further, the timing disk can in another aspect be primed and/or painted a dark color, such as for example black. This can ensure that the light detectors will function properly and will not be confused by rouge light taking advantage of the transparency of the timing disk material.

It is further contemplated in an alternative aspect that the timing plate can comprise any conventional mechanical mechanism capable of triggering the selective actuation or positioning of a ball bearing. For example, a timing plate can be formed having a plurality of raised pimples positioned in the outer circumference portion of the timing plate disk. In use, as the rotary display is rotated, a timing pimple can pass in alignment with a trigger switch, thus resulting in selective actuation.

An optional bearing system can also be integrated in to the exemplified display device. A bearing system may be desired in some capacity to ensure that the rotating motion of the display would always be as smooth and continuous as possible. An exemplary bearing system can be placed between the rotating disks and the axis about which they rotate. To minimize any increase in the overall size of the display, the bearing system could, for example, comprise a relatively flat thrust needle bearing mounted between the display base and the timing disk to help minimize friction as the rotary disk is turned by the user.

Figure 10:
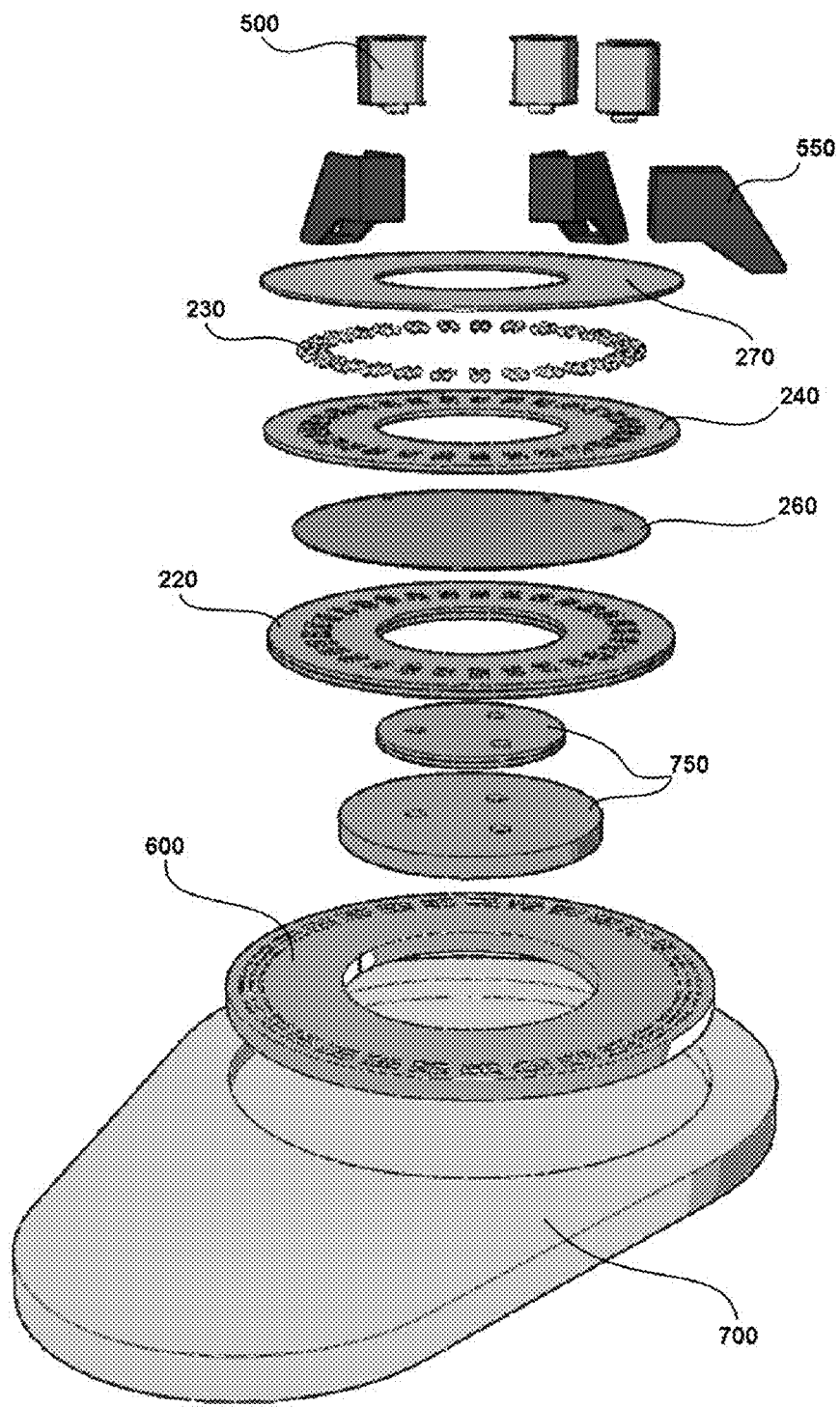
FIG. 10 is an exploded perspective view of an exemplary refreshable Braille display device comprising a base assembly according to one aspect of the present invention.

The display device can further comprise a base assembly constructed and arranged to support one or more components of the display device. As shown in the exploded view of FIG. 10, the components of the rotary display assembly can be mounted to a display base assembly 700. In particular, the rotary display assembly can be mounted to the base assembly by a support pillar 750. In one aspect, the support pillar can be a stationary pillar to which the stationary divider plate 260 can be connect. Further, the mounted stationary divider plate can, in this aspect, provide an axis of rotation about which the movable components of the rotary display assembly portion of the display can rotate, such as for example, the upper and lower rotary plates and the timing plate.

In one exemplary aspect, three electromagnets 500 (and the three corresponding LED-light sensor pairs) can be positioned directly above the top surface of the display along the back portion of the rotating disk. In particular, electromagnet mounting brackets 550 can be used to suspend the electromagnets in overlying registration with their corresponding row of Braille dots. In the exemplified aspect, the three electromagnets and LED-light sensor assemblies are further spaced approximately 60° apart from each other, in order to prevent any interference from the adjacent electromagnets, and to allow for separate, controlled actuation of each row of Braille dots.

A refreshable Braille display device of the present invention can further comprise a signal controller that interfaces between the computer text input and the RBD itself to send the correct signals at the correct time to actuate the individual Braille dots in order to make the Braille characters corresponding to the text on the computer. This controller can be a software package that would translate the written electronic text from Word documents, Excel spreadsheets, web pages, etc. into binary inputs that are sent to a control circuit (one for each electromagnet) that either supplies electricity to the electromagnet (through the separate relay circuit) or doesn't, depending on whether the signal is a binary 1 (on) or 0 (off), corresponding to a signal for a single Braille dot actuation and non-actuation, respectively, or vice versa. Additionally, because the three electromagnetic actuators are spaced 60° apart along the back portion of the display, the binary inputs to the control circuits for the electromagnets could be staggered and the separate actuation of each row of the cell timed such that as the user continuously rotates the display, each individual Braille cell is actuated in three separate sections of the display (by the three separate electromagnets, which are timed and activated by the three LED-light sensor pairs) and then displayed as a complete Braille cell as the user continues to rotate the cell around to the front of the display.

Furthermore, this controller could also monitor the time elapsed since the last signal was received from the LED-light sensor combination. After a specific amount of time elapses without another signal being received from the LED-light sensor combination (hence, the user is no longer rotating the display), the controller would automatically shut off any power to the electromagnets to avoid overheating or any other potentially hazardous situation. The power would then be restored to the electromagnets when a signal was again received by the controller from the LED-light sensor combinations, indicating that the user is again rotating the display.

According to this aspect, it would be the responsibility of the control system to produce the appropriate Braille text and to respond to user input. The commands the user may wish to send to the reader can include those which are typical of an electronic book reader (move forward, move back, bookmark, dictionary and the like), and commands which are specific to the motion-based Braille reader of this invention. The latter class of commands may include start/stop, speed adjustment and repeat (play back of the last few words to clarify an uncertainty). A display protocol may be implemented to aid identification of changes in context, as when the user jumps to a different location in text or looks up a reference. One example of such a protocol includes a separator (a brief interval of blank Braille characters, for example) whereby the user could be informed that the Braille characters following the blank interval are from a new portion of the text being read.

It is contemplated that all of the electronic components in the display device can be integrated into a display housing such that the RBD would be one fully-contained unit. The electronic controller that supplies the necessary input signal from the computer to the electromagnets could also be integrated into the RBD display housing. Thus, in one aspect, the display device can contain all of the subcomponents of the exemplified RBD, and would only require an interface to the computer it is being used with, such as a USB cable.

In use, the rotary display assembly consisting of the protective latex reading surface, ball bearings, upper rotary plate, lower rotary plate, and timing disk, can be rotated either manually or mechanically, i.e., by a motor. As the display rotates, the user can read the Braille text that is generated in each of the Braille character cells. While the formed characters are being read, character cells that have been read are continuously being refreshed and new characters are being created 180° from the reading surface of the rotary display assembly.

Accordingly, in another aspect, the present invention provides a method for displaying a refreshable Braille character. The method generally comprises providing a substantially planar Braille character display assembly of the present invention having a plurality of bearing chambers have a bearing disposed therein to form plurality of Braille character cell arrays configured to rotate about, and in a plane substantially perpendicular to, a rotary axis. As exemplified herein, at leas one of the plurality of bearing chambers of the Braille character cell array can be positioned in registration with a means for selectively positioning a bearing contained within the chamber. Once positioned, the bearing in the chamber can be selectively positioning in the upper portion of the bearing chamber to display a raised Braille character dot. The raised Braille dot, or the raised bearing, can then be maintained in the selectively raised position while the substantially planar Braille character display assembly is rotated at least one revolution about the rotary axis. These steps can be repeated until a desired number and pattern of bearings have been selectively positioned to display a desired Braille character cell.

For example, an exemplary sequence of the activation of all six Braille dots in a single Braille cell according to the present invention is illustrated schematically in FIGS. 11a-11g. Based on the geometry of the design, all six dots of a character are not actuated simultaneously but rather individually. Initially, the outermost dots are to be actuated, starting with the left-most one. Next, with these dots actuated, the middle row of dots is to be actuated, again starting with the left-most one. The innermost dots are actuated in a similar fashion. Therefore, after the character cell passes underneath the third electromagnet, all six dots will have been actuated (or not actuated, depending on the character being created) and the Braille character is complete. The refreshing of the character begins when the character first traverses the first electromagnet after passing by the user.

Figure 11A:
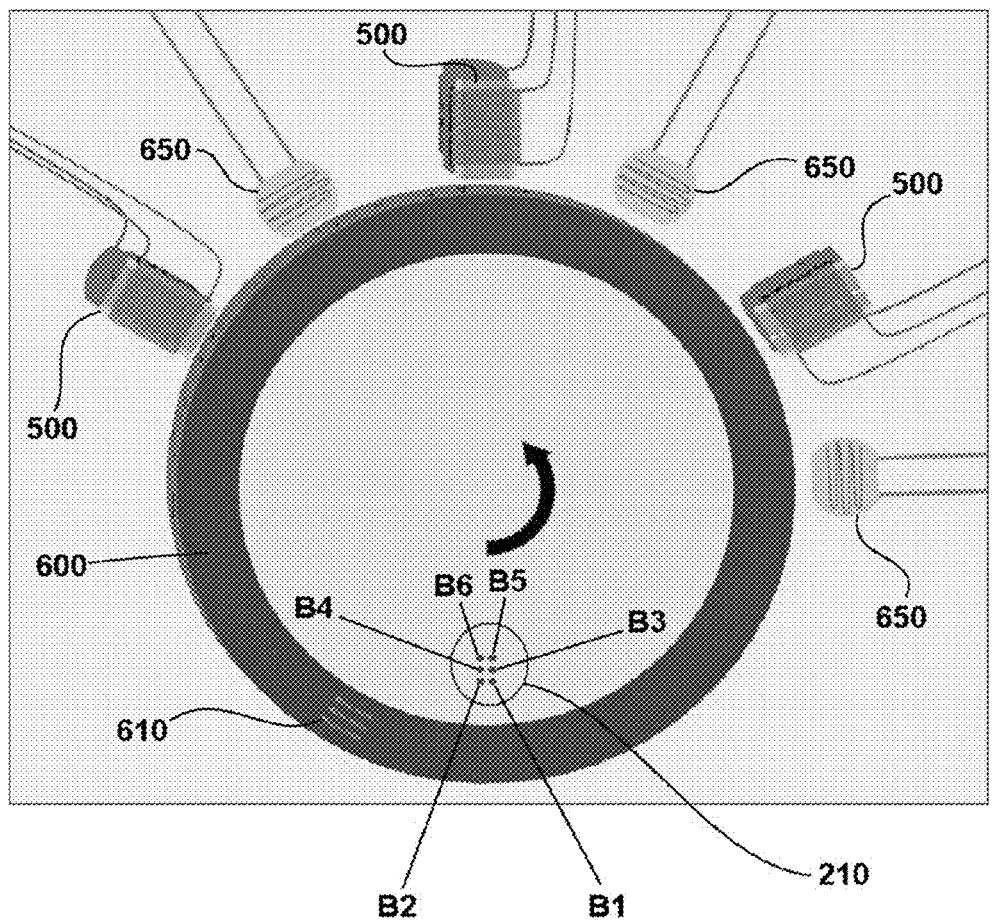
FIGS. 11a-11g schematically illustrate a sequence of the activation of all six Braille dots in a single Braille cell according to one aspect of the present invention.
Figure 11B:
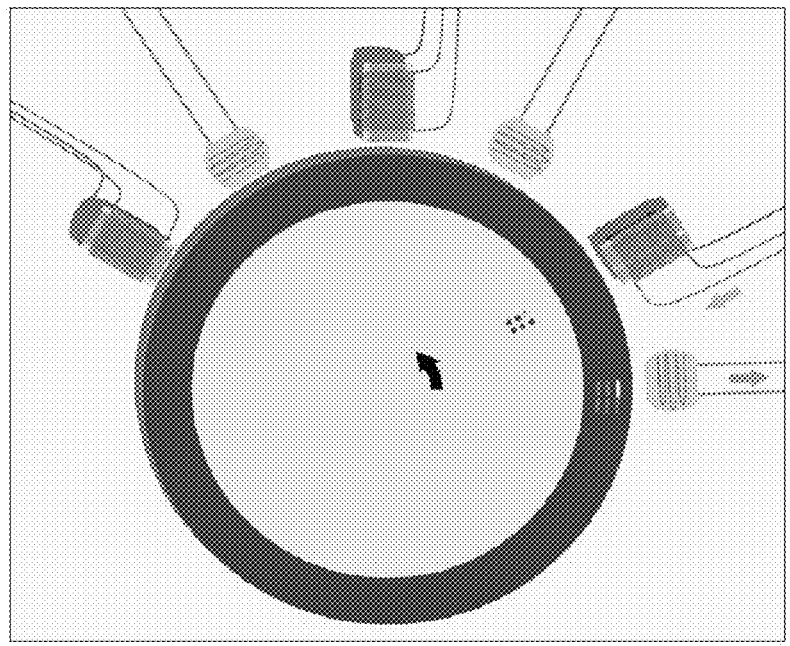
Figure 11C:
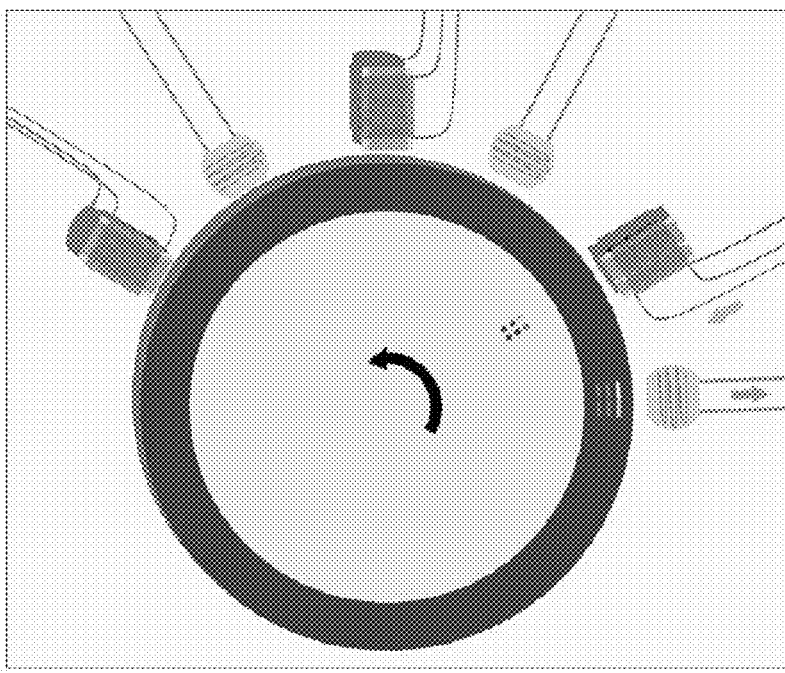
Figure 11D:
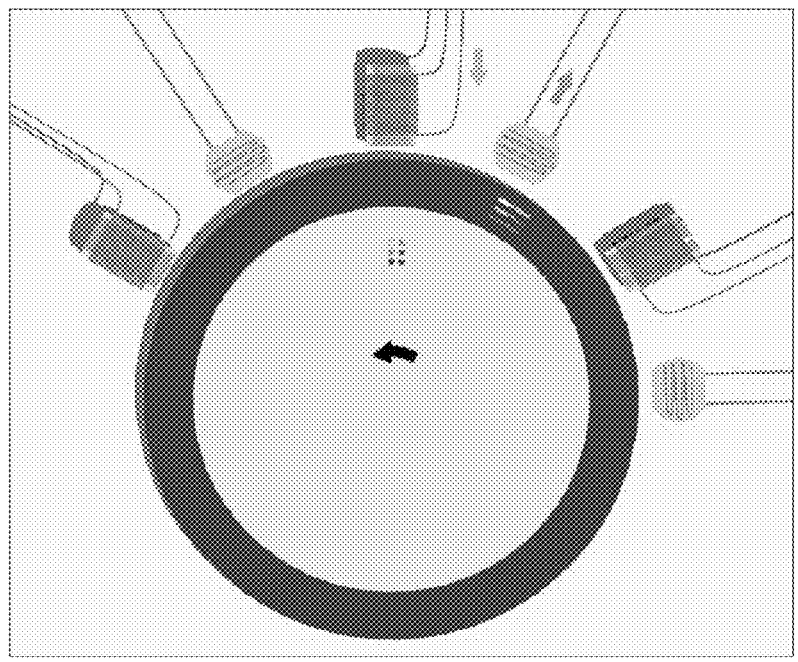
Figure 11E:
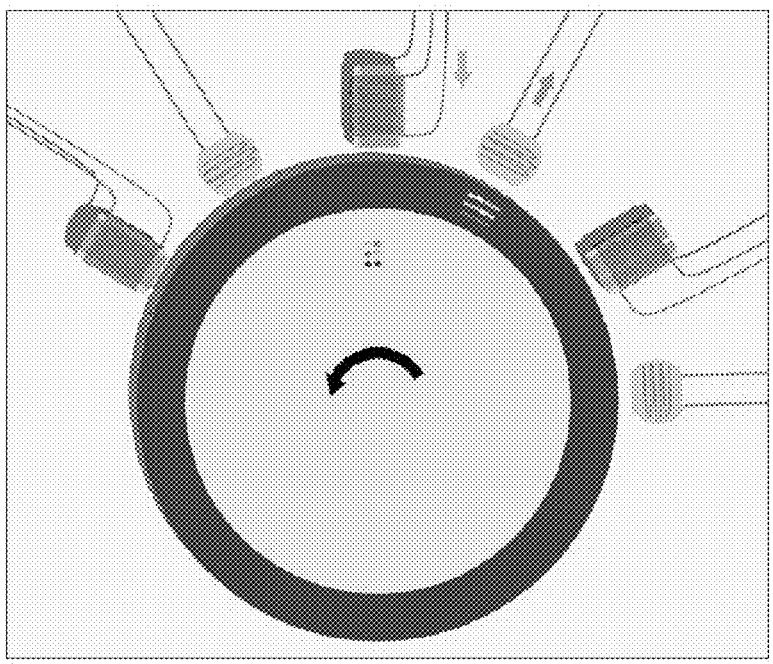
Figure 11F:
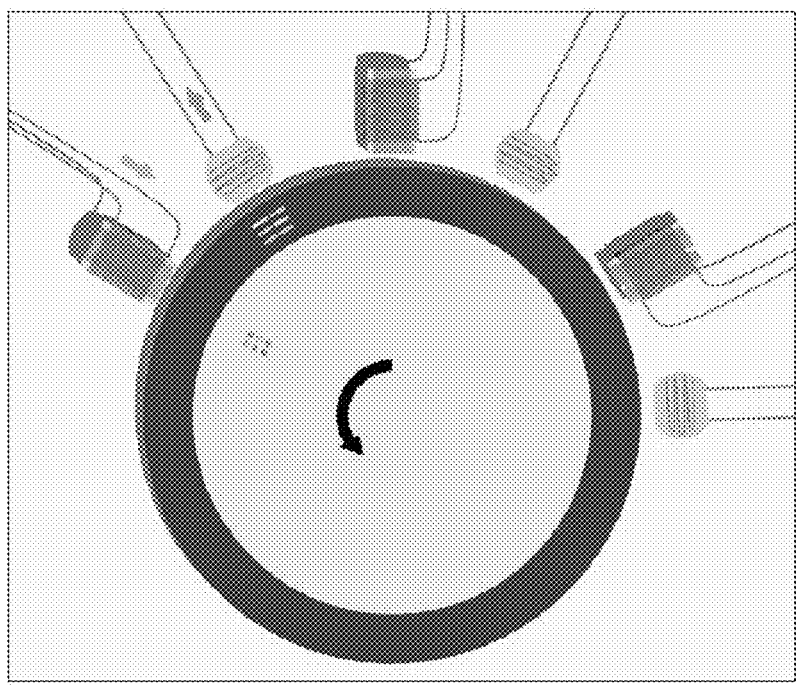
Figure 11G:
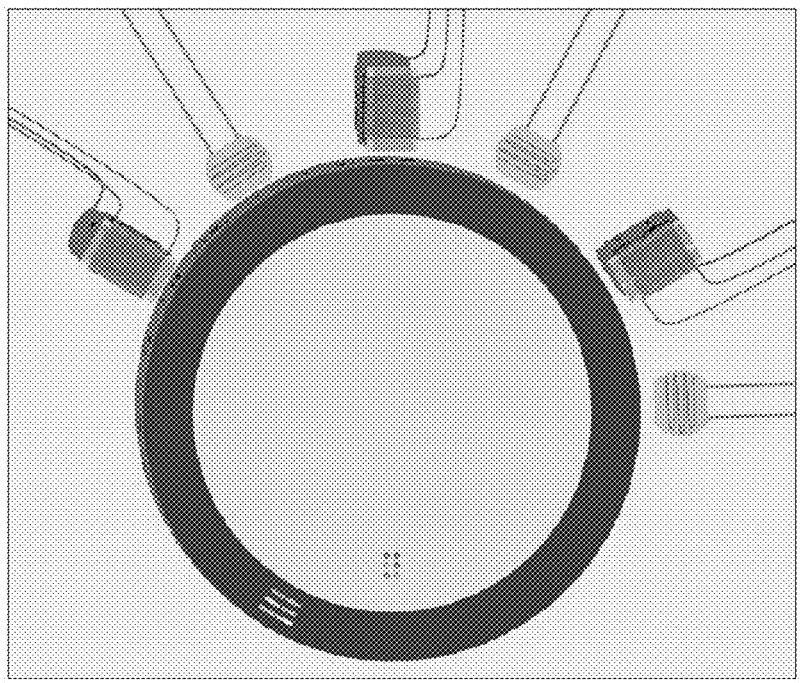

As shown in FIG. 11a, a user initially rotates the refreshable Braille display device reading surface as he/she reads the Braille text. With reference to FIG. 11b, as the timing aperture for bearing #1 (B1) reaches the light sensor, light passes through the timing aperture and a signal is sent from the light sensor to the signal controller. If the signal controller has received a signal to actuate this particular Braille dot, this turns on the electromagnet above B1, and causes the B1 ball bearing to be lifted up into the top position. In FIG. 11c, as the user continues to rotate the display, B1 will remain in the top position. Just as in FIG. 11b, as the timing aperture for bearing B2 reaches the light sensor, a signal is sent from the light sensor to the signal controller. If the signal controller has received a signal to actuate this particular Braille dot, this turns on the electromagnet above bearing B2. Just as before, this causes bearing B2 to be lifted up into the raised position. As the user continues to rotate the display, bearing B2 will also remain in the raised position. As the user continues to read and rotate the display, the Braille cell containing bearing B1 and B2 reaches the next light sensor-electromagnet actuator combination. In FIG. 11d, as light passes through the timing aperture for bearing B3, B3 is actuated or positioned into the raised position just as B1 and B2 were, and will remain in the top position as the user continues to rotate the display. As the user continues to rotate the display, B4 will be the next bearing actuated in the same manner as bearing B1, B2, and B3, and will remain in the raised position as the user continues to rotate the display. As the user further continues to read and rotate the display, the Braille cell containing bearings B1, B2, B3, and B4 reaches the next light sensor-electromagnet actuator combination. As light passes through the timing aperture for bearing B5, bearing B5 is actuated into the raised position just as bearings B1, B2, B3, and B4 were and will remain in the upper raised position as the user continues to rotate the display. Still further, as the user continues to rotate the display, bearing B6 will be actuated in the same manner as B1, B2, B3, B4, and B5, and will remain in the top position as the user continues to rotate the display. Now all of the six dots in this particular Braille cell are actuated, and as the user continues to rotate the display around, the newly actuated cell will reach the reading position, as depicted above. In the exemplified aspect, it is contemplated that there are 30 Braille cells positioned around the circumference of the display. Thus, as the user continues to read the Braille characters, he/she will rotate the display to bring the next Braille character into the reading position. This rotation is what causes the actuation that has just been described.

Lastly, it should be understood that while the present invention has been described in detail with respect to certain illustrative and specific aspects thereof, it should not be considered limited to such, as numerous modifications are possible without departing from the broad spirit and scope of the present invention as defined in the appended claims.

The invention claimed is:

1. A refreshable Braille display device comprising, a Braille character display assembly comprising:
   at least one rotary plate configured to rotate about a rotary axis- and defining a plurality of bearing chambers, wherein the plurality of bearing chambers each have a bearing disposed therein and form at least one Braille character cell array configured to rotate about, and in a plane substantially perpendicular to, the rotary axis; and
   a means for selectively positioning the bearing in at least one bearing chamber in the at least one Braille character cell array.

2. The refreshable Braille display device of claim 1, wherein the at least one rotary plate comprises:
   a lower rotary plate defining a plurality of lower bearing wells, each lower bearing well configured to house a bearing; and
   an upper rotary plate having a substantially planar reading surface and defining a plurality of upper bearing wells configured to receive a bearing.

3. The refreshable Braille display device of claim 1, wherein the at least one Braille character cell array is comprised of an array of at least six bearing chambers.

4. The refreshable Braille display device of claim 3, wherein the character display assembly comprises at least two Braille character cells arranged radially about, and in a plane substantially perpendicular to, the rotary axis.

5. The refreshable Braille display device of claim 2, wherein the upper rotary plate has a thickness less than the diameter of the bearing housed within the bearing chambers.

6. The refreshable Braille display device of claim 2, wherein the lower rotary plate has a thickness equal to or greater than the diameter of the bearing housed within the bearing chambers.

7. The refreshable Braille display device of claim 1, wherein the bearings are comprised of a magnetic metal.

8. The refreshable Braille display device of claim 1, wherein the means for selectively positioning the bearing in at least one bearing chamber comprises an electromagnet.

9. The refreshable Braille display device of claim 8, wherein the means for selectively positioning the bearing in at least one bearing chamber comprises at least three electromagnets.

10. The refreshable Braille display device of claim 2, further comprising a flexible bearing retention layer disposed on the planar reading surface of the upper rotary plate.

11. The refreshable Braille display device of claim 10, wherein the flexible bearing retention layer is comprised of latex.

12. The refreshable Braille display device of claim 1, further comprising a means for rotating the display assembly about the rotary axis at a predetermined rate of rotation.

13. A method for displaying a refreshable Braille character, comprising:
   a) providing a substantially planar Braille character display assembly comprising a plurality of bearing chambers, wherein the plurality of bearing chambers each have a bearing disposed therein and form a plurality of Braille character cell arrays configured to rotate about, and in a plane substantially perpendicular to, a rotary axis;

b) selectively positioning the bearing in at least one of the plurality of bearing chambers to display a raised Braille character dot; and c) selectively maintaining the selectively positioned bearing of step b) while the substantially planar Braille character display assembly is rotated at least one revolution about the rotary axis.

14. The method of claim 13, wherein the bearing of step b) is selectively positioned in the bearing chamber by applying an electromagnetic force to the bearing.

15. The method of claim 13, further comprising repeating steps b) and c) until a plurality of bearings are selectively positioned in the bearing chamber to display a desired Braille character.

16. The method of claim 13, further comprising refreshing the selectively maintained bearing of step c) by selectively repositioning the bearing after the bearing chamber has made at least one complete revolution about the rotary axis.

* * * * *